United States Patent
Zhu et al.

(10) Patent No.: US 11,133,530 B2
(45) Date of Patent: Sep. 28, 2021

(54) ELECTROLYTE FORMULATIONS FOR ELECTROCHEMICAL CELLS CONTAINING A SILICON ELECTRODE

(71) Applicant: Wildcat Discovery Technologies, Inc, San Diego, CA (US)

(72) Inventors: Ye Zhu, San Diego, CA (US); Gang Cheng, San Diego, CA (US); Deidre Strand, San Diego, CA (US); Jen-Hsien Yang, San Diego, CA (US)

(73) Assignee: Wildcat Discovery Technologies, Inc., San Diego, CA (US)

( * ) Notice: Subject to any disclaimer, the term of this patent is extended or adjusted under 35 U.S.C. 154(b) by 0 days.

(21) Appl. No.: 16/399,636

(22) Filed: Apr. 30, 2019

(65) Prior Publication Data

US 2019/0260079 A1 Aug. 22, 2019

Related U.S. Application Data

(63) Continuation of application No. 15/689,776, filed on Aug. 29, 2017.

(60) Provisional application No. 62/381,323, filed on Aug. 30, 2016.

(51) Int. Cl.
| | | |
|---|---|---|
| *H01M 6/04* | (2006.01) | |
| *H01M 10/0567* | (2010.01) | |
| *H01M 4/134* | (2010.01) | |
| *H01M 10/0525* | (2010.01) | |
| *H01M 10/0569* | (2010.01) | |
| *H01M 4/02* | (2006.01) | |

(52) U.S. Cl.
CPC ....... *H01M 10/0567* (2013.01); *H01M 4/134* (2013.01); *H01M 10/0525* (2013.01); *H01M 10/0569* (2013.01); *H01M 2004/027* (2013.01); *H01M 2300/0025* (2013.01)

(58) Field of Classification Search
CPC .... H01M 4/134; H01M 4/1394; H01M 4/131; H01M 4/1391; H01M 4/48; H01M 4/50; H01M 4/52; H01M 10/0564; H01M 10/0566; H01M 10/0567; H01M 10/0569; H01M 10/0525; H01M 2004/027; H01M 2300/0025
See application file for complete search history.

(56) References Cited

U.S. PATENT DOCUMENTS

| | | | |
|---|---|---|---|
| 5,830,600 A | 11/1998 | Narang et al. | |
| 5,869,208 A | 2/1999 | Miyasaka | |
| 5,874,018 A | 2/1999 | Ferrar et al. | |
| 6,077,628 A | 6/2000 | Takechi et al. | |
| 6,203,942 B1 | 3/2001 | Gan et al. | |
| 6,235,431 B1 | 5/2001 | Takechi et al. | |
| 6,350,546 B1 | 2/2002 | Gan et al. | |
| 6,379,846 B1 | 4/2002 | Terahara et al. | |
| 6,416,901 B1 | 7/2002 | Fauteux et al. | |
| 6,485,868 B1 | 11/2002 | Tsujioka et al. | |
| 6,680,147 B2 | 1/2004 | Lee | |
| 6,797,437 B2 | 9/2004 | Tsukamoto et al. | |
| 6,806,004 B1 | 10/2004 | Iwamoto et al. | |
| 6,872,493 B2 | 3/2005 | Yamada et al. | |
| 6,887,619 B2 | 5/2005 | West et al. | |
| 6,902,850 B2 | 6/2005 | Wariishi et al. | |
| 6,995,225 B2 | 2/2006 | Arai et al. | |
| 7,097,942 B2 | 8/2006 | Hwang et al. | |
| 7,169,510 B2 | 1/2007 | Awano et al. | |
| 7,211,353 B2 | 5/2007 | Kashida et al. | |
| 7,241,536 B2 | 7/2007 | Kim et al. | |
| 7,252,908 B2 | 8/2007 | Kim et al. | |
| 9,425,485 B1 * | 8/2016 | Cheng | H01M 10/4235 |
| 2003/0124432 A1 | 7/2003 | Miura et al. | |
| 2004/0096737 A1 | 5/2004 | Kim et al. | |
| 2004/0234865 A1 | 11/2004 | Sato et al. | |
| 2006/0166100 A1 | 7/2006 | Takahashi et al. | |
| 2006/0172200 A1 | 8/2006 | Yoon et al. | |
| 2006/0269846 A1 | 11/2006 | Ku et al. | |
| 2007/0212614 A1 | 9/2007 | Kim et al. | |
| 2007/0224506 A1 | 9/2007 | Ooyama et al. | |
| 2007/0298320 A1 | 12/2007 | Barrandon et al. | |
| 2008/0134492 A1 | 6/2008 | Amine et al. | |
| 2008/0138714 A1 | 6/2008 | Ihara et al. | |
| 2008/0138715 A1 | 6/2008 | Ihara et al. | |
| 2008/0166637 A1 | 7/2008 | Inagaki et al. | |
| 2009/0027827 A1 | 1/2009 | Siggel et al. | |
| 2009/0163394 A1 | 6/2009 | Muraishi et al. | |
| 2009/0181311 A1 | 7/2009 | Iwanaga et al. | |

(Continued)

FOREIGN PATENT DOCUMENTS

| | | |
|---|---|---|
| CN | 101771167 A | 7/2010 |
| EP | 1037293 A1 | 9/2000 |

(Continued)

OTHER PUBLICATIONS

International Search Report & Written Opinion dated Dec. 6, 2017 in International application No. PCT/US2017/049111.

Bouillon, Jean-Philippe et al., "Synthesis and Intramolecular Aldol Reactions of 1,6- and 1,7-Bis(acylsilanes)" European Journal of Organic Chemistry (1999) 1571-1580.

Fisher, Craig A.J. et al., "Lithium Battery Materials LiMPO4 (M = Mn, Fe, Co, and Ni): Insights into Defect Association, Transport Mechanism, and Doping Behavior" Chemical Materials 2008, 20, 5907-5915.

(Continued)

*Primary Examiner* — Raymond Alejandro
(74) *Attorney, Agent, or Firm* — The Small Patent Law Group LLC; Philip S. Hof

(57) ABSTRACT

Additives to electrolytes that enable the formation of comparatively more robust SEI films on silicon anodes. The SEI films in these embodiments are seen to be more robust in part because the batteries containing these materials have higher coulombic efficiency and longer cycle life than comparable batteries without such additives.

17 Claims, 1 Drawing Sheet

(56) References Cited

U.S. PATENT DOCUMENTS

| | | |
|---|---|---|
| 2009/0191465 A1 | 7/2009 | Hwang et al. |
| 2009/0197167 A1 | 8/2009 | Olschimke |
| 2009/0202892 A1 | 8/2009 | Inagaki et al. |
| 2009/0202905 A1 | 8/2009 | Morita et al. |
| 2009/0253045 A1 | 10/2009 | Kotato et al. |
| 2009/0263726 A1 | 10/2009 | Yamaguchi et al. |
| 2009/0286155 A1 | 11/2009 | Takehara |
| 2009/0286157 A1 | 11/2009 | Chen et al. |
| 2009/0311609 A1 | 12/2009 | Saisho et al. |
| 2010/0015514 A1 | 1/2010 | Miyagi et al. |
| 2010/0035146 A1 | 2/2010 | Fujii et al. |
| 2010/0092863 A1 | 4/2010 | Kim |
| 2010/0099031 A1 | 4/2010 | Kato et al. |
| 2010/0119956 A1 | 5/2010 | Tokuda et al. |
| 2010/0159336 A1 | 6/2010 | Kim et al. |
| 2010/0183926 A1 | 7/2010 | Kim et al. |
| 2010/0216036 A1 | 8/2010 | Shima |
| 2010/0273045 A1 | 10/2010 | Hasegawa et al. |
| 2010/0304224 A1 | 12/2010 | Yoshimura et al. |
| 2010/0330433 A1 | 12/2010 | Amine et al. |
| 2011/0027663 A1 | 2/2011 | Ohkubo et al. |
| 2011/0111294 A1 | 5/2011 | Lopez et al. |
| 2011/0123870 A1 | 5/2011 | Oh et al. |
| 2011/0136018 A1 | 6/2011 | Mogi et al. |
| 2011/0274985 A1 | 11/2011 | Usrey et al. |
| 2012/0288771 A1 | 11/2012 | Lim et al. |
| 2012/0315534 A1 | 12/2012 | Bhat et al. |
| 2014/0011081 A1 | 1/2014 | Ahn et al. |
| 2014/0120414 A1* | 5/2014 | Bhat ................ H01M 10/0567 429/188 |
| 2016/0240889 A1 | 8/2016 | Cheng et al. |
| 2017/0170477 A1* | 6/2017 | Sakshaug ................ C04B 41/85 |

FOREIGN PATENT DOCUMENTS

| | | |
|---|---|---|
| EP | 1898485 A1 | 3/2008 |
| JP | H09283176 A | 10/1997 |
| JP | 2001057237 A | 2/2001 |
| JP | 2001313073 | 11/2001 |
| JP | 2007123097 A | 5/2007 |
| JP | 2007287491 A | 11/2007 |
| JP | 2008146930 A | 6/2008 |
| JP | 2009037868 A | 2/2009 |
| JP | 2010251313 A | 11/2010 |
| JP | 2011049152 A | 3/2011 |
| JP | 2011077029 A | 4/2011 |
| JP | 2013145702 A | 7/2013 |
| KR | 100813309 B1 | 3/2008 |
| KR | 20080110160 A | 12/2008 |

OTHER PUBLICATIONS

Goodenough, John B. et al., "Challenges for Rechargeable Li Batteries" Chemistry of Materials Review 2010, 22, 587-603.

Johnson, Christopher S. et al., "Synthesis, Characterization and Electrochemistry of Lithium Battery Electrodes: kLi2MnO3-(1-x)LiMn0.333Ni0.333Co0.333O2 (0<x<0.7)" Chemical Materials 2008, 20, 6095-6106.

Kang, S.-H. et al., "Interpreting the structural and electrochemical complexity of 0.5Li2MnO3-0.5LiMO2 electrodes for lithium batteries" Journal of Materials Chemistry, 2007, 17, 2069-2077.

Marom, Rotem et al., "A review of advanced and practical lithium battery materials" Journal of Materials Chemistry, 2011, 21, 9938.

Nagahama, Masatoshi et al., "High Voltage Performances of Li2NiPO4F Cathode with Dinitrile-Based Electrolytes" Journal of the Electrochemical Society, 157 (6) A748-A752 (2010).

Saleur, Damien et al., "First synthesis of 1,4-bis(acylsilanes)" Tetrahedron Letters 41 (2000) 321-324.

Supplementary European Search Report dated Jun. 2, 2015 in European Patent application No. EP12796608.3.

* cited by examiner

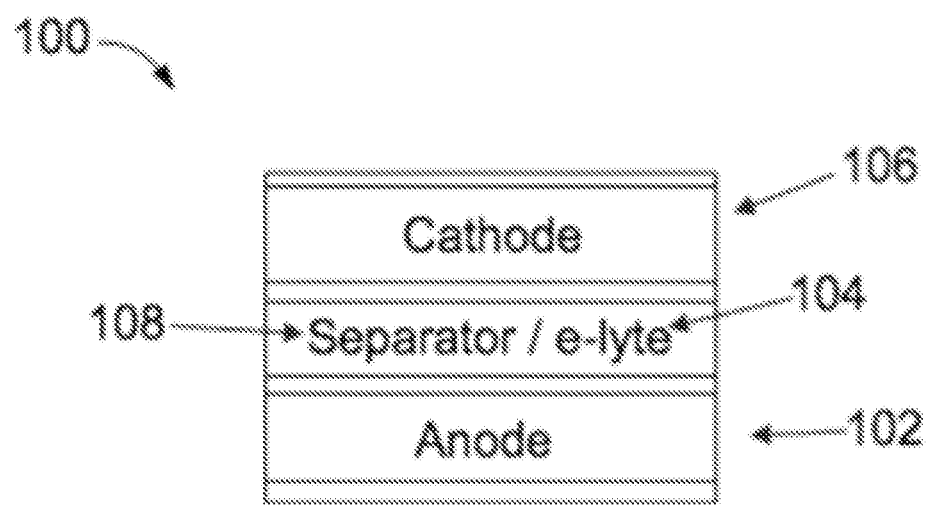

ELECTROLYTE FORMULATIONS FOR ELECTROCHEMICAL CELLS CONTAINING A SILICON ELECTRODE

CROSS-REFERENCE TO RELATED APPLICATIONS

The present application is a continuation of and claims the benefit of U.S. non-provisional application Ser. No. 15/689,776 filed Aug. 29, 2017 entitled "Electrolyte Formulations for Electrochemical Cells Containing a Silicon Electrode". The '776 application claims the benefit of priority to U.S. provisional patent application Ser. No. 62/381,323 filed Aug. 30, 2016 entitled "Electrolyte Formulations for Lithium Ion Batteries". Both of the '776 and '323 applications are incorporated by reference herein in their entireties.

STATEMENT REGARDING FEDERALLY SPONSORED RESEARCH OR DEVELOPMENT

This invention was made with government support under DOE EE0006453 awarded by the Department of Energy. The government has certain rights in the invention.

BACKGROUND OF THE INVENTION

The present invention is in the field of battery technology and, more particularly, electrolyte formulations that address challenges encountered during the use of silicon anodes in lithium ion batteries.

Lithium ion batteries enjoy relatively widespread use, but research continues into improving the energy density, capacity, and cycle life of these batteries. For example, silicon has been used as an anode material to improve the energy density of lithium ion cells. Silicon anodes can provide high energy density to lithium ion batteries due to the high theoretical capacity of silicon, which is 4200 mAh/g. However, the silicon particles that make up the anode can undergo larges changes in their volume during battery cycling. The volumetric changes on lithiation and delithiation cycles can be as large as about 300%.

These large volumetric changes in the silicon anode material can have negative effects on battery cycle life. A number of mechanisms may contribute to poor cycle life. For example, silicon particles can fracture due to the large stresses in the material brought on by the large changes in volume during cycling. These fractures can result in electrically isolated particle fragments that can no longer contribute to the capacity during cycling. Even when silicon particles do not completely fracture, the large stresses in the anode material can result in cracks in the particle and delamination of the particle surface. These cracks and delaminations can result in portions of the active material being electrically isolated and unable to contribute to the capacity during cycling.

As another example of a failure mechanism, the solid-electrolyte interphase (SEI) that forms on the surface of silicon anode particles tends to not be mechanically robust. The result is cracking and delamination of this thin SEI layer on the particles as the large volume changes occur. Therefore, more SEI must be formed on each cycle to replace the cracked or delaminated SEI. But, this is not ideal because forming SEI irreversibly consumes battery capacity and creates gas products. Generally, a stable SEI should be formed on the initial cycles and should not need to be reformed.

Thus, there exists a need for an electrolyte formulation for silicon anodes in a lithium ion battery that improves cycle life by forming a more mechanically robust SEI. These and other challenges can be addressed by certain embodiments of the invention described herein.

BRIEF SUMMARY OF THE INVENTION

Embodiments of the present invention are additives to electrolytes that enable the formation of comparatively more robust SEI films on silicon anodes. The SEI films in these embodiments are seen to be more robust in part because the batteries containing these materials have higher coulombic efficiency and longer cycle life than comparable batteries without such additives.

Embodiments of the present invention include the methods of making such electrolytes using the additives disclosed herein, the methods of assembling batteries including such electrolytes using the additives disclosed herein, and using batteries including such electrolytes using the additives disclosed herein.

Embodiments of the present invention include an electrochemical cell having a silicon based anode and a liquid electrolyte solution comprising an additive.

BRIEF DESCRIPTION OF SEVERAL VIEWS OF THE DRAWINGS

FIG. 1 illustrates a lithium ion battery implemented according to an embodiment of the invention.

DETAILED DESCRIPTION OF THE INVENTION

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

The term "NMC" refers generally to cathode materials containing $LiNi_xMn_yCo_zO_w$ and includes, but is not limited to, cathode materials containing $LiNi_{0.33}Mn_{0.33}Co_{0.33}O_2$. Typically, $x+y+z=1$ and $0<w<3$.

Ranges presented herein are inclusive of their endpoints. Thus, for example, the range 1 to 3 includes the values 1 and 3 as well as the intermediate values.

In some embodiments disclosed herein, electrolyte solutions formulated to contain specific additive types can improve energy density, capacity, and cycle life of these batteries.

FIG. 1 illustrates a lithium ion battery 100 implemented in accordance with an embodiment of the invention. The battery 100 includes an anode 102, a cathode 106, and a separator 108 that is disposed between the anode 102 and the cathode 106. In the illustrated embodiment, the battery 100 also includes a high voltage electrolyte 104, which is disposed within and between the anode 102 and the cathode 106 and remains stable during high voltage battery cycling.

The operation of the battery 100 is based upon reversible intercalation and de-intercalation of lithium ions into and from host materials of the anode 102 and the cathode 106. Other implementations of the battery 100 are contemplated, such as those based on conversion chemistry. Referring to FIG. 1, the voltage of the battery 100 is based on redox potentials of the anode 102 and the cathode 106, where lithium ions are accommodated or released at a lower potential in the former and a higher potential in the latter. To allow both a higher energy density and a higher voltage platform to deliver that energy, the cathode 106 includes an active cathode material for high voltage operations at or above 4.3V.

Silicon-containing anodes can provide a higher energy density than carbon-based anodes. While the theoretical capacity of a silicon anode is on the order of 4200 mAh/g, it is necessary to balance the high capacity of a silicon anode with the undesirable properties that a silicon anode can have. For example, a silicon anode can have relatively high changes in volume during a charge/discharge cycle. The volumetric changes in a silicon anode can be from 70% to 300% over the range of desired anode capacities. That is, for an anode where only a small portion of the silicon capacity is utilized, the silicon may experience a volumetric change on the order of about 70%. In contrast, for an anode where a comparatively high portion of the silicon capacity is utilized, the silicon may experience a volumetric change on the order of about 300%. In certain embodiments disclosed herein, silicon anodes with capacities in the range of about 600 mAh/g to about 1200 mAh/g are matched with cathode materials having a similar capacity to yield a battery that demonstrates stable cycle life in the presence of an electrolyte containing additives discloses herein. The electrolyte additives disclosed herein provide an unexpected improvement in the capacity fade during cycling compared to the baseline formulations without such additives in batteries containing a silicon-based anode.

Known batteries containing silicon anodes experience limited cycle life and poor coulombic efficiency. The deficiencies of known batteries containing silicon-based anode can be due to a loss of connectivity in the anode of the active silicon material. The loss of connectivity can be due to structural defects in the anode related to the large change in volume experienced by the anode. The large volumetric changes can result in cracking and/or delamination of the electrode. Also, the large volumetric changes may be related to an unstable or ineffective SEI on the active silicon electrode. Further, the SEI formed from an ethylene carbonate based electrolyte on a silicon anode may also be unstable or ineffective regardless of the volumetric changes experiences by a silicon-based anode.

Certain additives disclosed herein improve the mechanical stability of the SEI formed in the presence of common electrolyte solvents such as ethylene carbonate. The additives disclosed herein provide surprising improvements to the performance of batteries containing silicon-based anodes. Unexpectedly, the additives do not demonstrate similar performance improvements in batteries having graphite anodes.

The additives disclosed herein yield an electrolyte solution that provides an electrochemically and mechanically robust SEI. The additives disclosed herein yield an electrolyte solution that enables the SEI to withstand the relatively large volumetric expansions and contractions known to occur in silicon-based anodes. These additives enable both the anode and cathode to be chemically, electrochemically, and mechanically stable through multiple battery cycles.

Certain additives disclosed in electrolyte formulations described herein are capable of enabling the formation of stable SEI with organic solvents such as ethylene carbonate. Based on prior uses of silicon anodes, it appears that electrolytes based on ethylene carbonate are inadequate for forming a stable SEI. Surprisingly, the additives disclosed herein can yield a stable SEI on a silicon-based anode when used in electrolyte formulations based on ethylene carbonate. Further, other solvent types may be used in conjunction with, or instead of, ethylene carbonate. For example, solvents including lactone, nitrile, sulfone, and carbonates groups may be useful.

Prior art electrolyte formulations for silicon anodes, and for the more common carbon anodes, contain ethylene carbonate (EC). EC is understood to play an important role in the formation of a stable SEI on carbon anodes. EC also participates in SEI formation on silicon, but, as discussed above, the SEI formed on silicon anodes using conventional electrolytes (including EC) is not mechanically robust. The lack of mechanical robustness is evidenced by poor electrochemical performance, such as poor coulombic efficiency and poor cycle life. Physically, films that lack mechanical robustness may appear to be inhomogeneous and/or may appear to have physical defects. Mechanically robust SEI forms a stable film at the electrode/electrolyte interface.

Using electrolyte additives disclosed herein, improvement was demonstrated in full cells containing NMC cathodes and silicon alloy based anodes. The electrolyte formulations preferably contain EC. Certain additives can improve coulombic efficiency and cycle life by forming a more mechanically robust SEI layer on the silicon anode. This may be due to a more polymeric nature of the resulting SEI or a modified ratio of organic components as compared to inorganic components in the SEI.

Certain of the additives are organic additives that include a silicon-containing group, and certain of the additives are organic additives that include a fluorine-containing group, Without being bound to any particular hypothesis or mechanism of action, some of the additives disclosed herein may react with the EC to increase the molecular weight of the SEI that forms on the anode. Certain additives may act in a way analogous to chain extenders in the context of polymer formulation and processing, thereby increasing the molecular weight and film forming capability of the SEI that is typically generated from the EC in a conventional electrolyte solution.

The amount of additive can be expressed as a weight percent (wt %) of the total weight of the electrolyte formulation. In certain embodiments of the invention, the additive is present at an amount that is significantly lower than the amount of electrolyte salt present in the electrolyte formulation of the electrochemical cell. In certain embodiments of the invention, the concentration of additive in the electronic formulation is less than or equal to about 5 weight percent, more preferably less than or equal to about 4 weight percent, more preferably less than or equal to about 3 weight percent, and still more preferably less than or equal to about 2 weight percent.

In certain embodiments of the invention, the concentration of additive in the electronic formulation is equal to about 6.0 wt %, 5.9 wt %, 5.8 wt %, 5.7 wt %, 5.6 wt %, 5.5 wt %, 5.4 wt %, 5.3 wt %, 5.2 wt %, 5.1 wt %, 5.0 wt %, 4.9 wt %, 4.8 wt %, 4.7 wt %, 4.6 wt %, 4.5 wt %, 4.4 wt %, 4.3 wt %, 4.2 wt %, 4.1 wt %, 4.0 wt %, 3.9 wt %, 3.8 wt %, 3.7 wt %, 3.6 wt %, 3.5 wt %, 3.4 wt %, 3.3 wt %, 3.2 wt %, 3.1 wt %, 3.0 wt %, 2.9 wt %, 2.8 wt %, 2.7 wt %, 2.6 wt %, 2.5 wt %, 2.4 wt %, 2.3 wt %, 2.2 wt %, 2.1 wt %, 2.0 wt %, 1.9 wt %, 1.8 wt %, 1.7 wt %, 1.6 wt %, 1.5 wt %, 1.4 wt %, 1.3 wt %, 1.2 wt %, 1.1 wt %, 1.0 wt %, 0.9 wt %, 0.8 wt %, 0.7 wt %, 0.6 wt %, 0.5 wt %, 0.4 wt %, 0.3 wt %, 0.2 wt %, or 0.1 wt %.

In preferred embodiments, the additive is substantially soluble in conventional electrolyte solvents.

Methods

Battery Cell Assembly.

Battery cells were assembled in a high purity argon filled glove box (M-Braun, $O_2$ and humidity content <0.1 ppm). A $LiNi_{0.33}Mn_{0.33}Co_{0.33}O_2$(NMC) cathode electrode and a silicon alloy anode electrode was used. For control cells, an NMC cathode electrode and a graphite anode electrode were used. Each battery cell includes a cathode film, a polypropylene separator, and composite anode film. Electrolyte components were formulated and added to the battery cell.

Electrolyte Formulations.

Electrolyte formulations used as controls were made from one or more organic solvents and a lithium salt. Organic solvents ethylene carbonate (EC) and ethyl methyl carbonate (EMC) were blended at a 1:2 ratio, by volume, of EC:EMC. The lithium salt was $LiPF_6$ at a concentration of 1M. The electrolyte formulations containing additives were made from 1:2 ratio, by volume, of EC:EMC with 1M $LiPF_6$ at a variety of additive weight percentages.

SEI Formation.

Solid-electrolyte interphase (SEI) is formed during a formation cycle. For the cells tested herein, the formation cycle was 12 hours open circuit voltage (OCV) hold, followed by a C/10 charge to 4.2 V with a constant voltage (CV) hold to C/20, and then a C/10 discharge to 2.8 V.

Cycle Life Testing.

For lower voltage cycle life testing, cycling was continued at C/3 charge to 4.2 V with a CV hold to C/20 followed by a C/3 discharge to 2.8 V. For higher voltage cycle life testing, cycling between 4.45 V and 3.0 V. In the tables presented herein, the performance metrics are calculated from the average of two tested cells.

Results

Table 1 presents the electrochemical performance of electrolyte formulations containing various additives according to certain combinations of the above structural representations as compared to a control electrolyte formulation. The additives were tested at formulations including 2 weight percent of the additive, 0.5 weight percent of the additive, and 0.25 weight percent of the additive, in each case with EC/EMC organic solvents. The cathode included NMC as the active material. The capacity retention at the two hundred fifth discharge cycle is presented in the far right column as a percentage of the capacity at the seventh test cycle.

TABLE 1

Performance of electrolyte additives in EC based electrolyte with silicon anode

| Additive | Conc. (%) | Cycle 7 Capacity (mAh/g) | Cycle 205 Capacity (mAh/g) | Capacity retention (%) |
| --- | --- | --- | --- | --- |
| None | 0 | 139 | 70 | 53.0 |
| mono-(trimethylsilyl)phosphite | 0.5 | 140 | 102 | 72.6 |
| tris(trimethylsilyl)phosphite | 2 | 136 | 109 | 80.1 |
| tris(trimethylsilyl)phosphate | 2 | 123 | 114 | 92.7 |
| tris(trimethylsilyl)borate 99% | 0.5 | 142 | 93 | 65.5 |
| maleic anhydride | 0.5 | 136.2 | 67 | 49.1 |
| tris(trimethylsiloxy)vinylsilane | 0.5 | 137 | 84 | 61.3 |
| tris(trimethylsilyl)silane | 0.5 | 132 | 102 | 77.3 |
| tris(trimethylsilyl)borate 99% | 2 | 138 | 101 | 73.2 |
| D(+)glucose | 0.5 | 138 | 67 | 48.7 |
| tris(2,2,2-trifluoroethyl)phosphite | 0.5 | 135 | 84 | 62.2 |
| bis(triphenylphosphine) copper tetrahydroborate | 2 | 138 | 79 | 57.2 |
| diphenylsilane | 0.5 | 140 | 79 | 56.3 |
| vinyltrimethoxysilane | 0.5 | 137 | 74 | 54.0 |
| trihexadecylborate | 0.5 | 139 | 77 | 55.4 |
| nitrosonium tetrafluoroborate | 0.25 | 134 | 100 | 74.6 |
| methyl 2,2,2-trifluoroethyl carbonate | 2 | 141 | 72 | 51.1 |
| 4-tert-butyl-2,6-dimethylphenylsulfur trifluoride | 0.5 | 127 | 74 | 58.0 |
| trimethylsilyl polyphosphate | 2 | 136 | 90 | 66.2 |
| diallyl phosphite | 0.5 | 137 | 49 | 35.7 |

Table 1 demonstrates that certain additives in EC-containing formulations result in much improved cycle life at cycle 205. The electrolyte formulations containing certain of the additives resulted in improvement in the cycle life (that is, capacity retention) as compared to the prior art silicon anode systems.

Table 2 presents the electrochemical performance of electrolyte formulations containing some of the same additives as Table 1, except the cells were operated at higher voltage. The cathode included NMC as the active material. The capacity retention at the two hundredth discharge cycle is presented in the far right column as a percentage of the capacity at the initial test cycle.

TABLE 2

Performance of electrolyte additives in EC based electrolyte with silicon anode at higher cell voltage

| Additive | Conc. (%) | Initial Capacity at 0.33 C (mAh/g) | Cycle 200 Capacity (mAh/g) | Cycle 200 Capacity retention (%) |
| --- | --- | --- | --- | --- |
| None | 0.0 | 158.2 | 93.0 | 58.9 |
| FEC | 2 | 160.8 | 123.8 | 77.0 |
| tris(trimethylsilyl)phosphite | 2 | 160.1 | 135.6 | 84.7 |
| mono-(trimethylsilyl) phosphite | 0.5 | 163.4 | 135.5 | 82.9 |
| tris(trimethylsiloxy) ethylene | 2 | 150.8 | 138.2 | 91.7 |

Table 2 demonstrates that certain additives in EC-containing formulations result in much improved cycle life at cycle 200. The electrolyte formulations containing the additives resulted in improvement in the cycle life (that is, capacity retention) as compared to the control silicon anode systems. Finally, the data demonstrate that the additives showed no negative effect on initial discharge capacity.

Without being bound to any particular hypothesis or mechanism of action, the additives disclosed herein may serve as strong oxidants, oxidizing and functionalizing silicon particle surfaces with an SiOx-enriched surface layer. Further, the additives may aid in balancing the inorganic and organic content of the SEI, which can promote a stable and robust SEI.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

The invention claimed is:

1. A method of forming a solid-electrolyte interphase on an anode in a lithium ion battery, comprising:
    charging and discharging the lithium ion battery to form the solid-electrolyte interphase, wherein the lithium ion battery comprises: (i) an anode comprising silicon; (ii) a cathode; and (iii) an electrolyte solution;
    wherein the electrolyte solution comprises a lithium salt, ethylene carbonate, and an organic additive selected from the group consisting of mono-(trimethylsilyl) phosphite, tris(trimethylsilyl)phosphite, tris(trimethylsilyl)phosphate, tris(trimethylsilyl)borate, tris(trimethylsiloxy)vinylsilane, tris(trimethylsilyl)silane, and tris(trimethylsiloxy) ethylene.

2. The method of claim 1 wherein the battery is charged to at least 4.2 V.

3. The method of claim 1 wherein the battery is charged to greater than 4.2 V.

4. The method of claim 1 wherein the battery is charged to at least 4.45 V.

5. The method of claim 1 wherein the battery is charged and discharged at least 200 times and the solid-electrolyte interphase remains stable as demonstrated by a capacity retention by the battery of at least 60% at cycle 200.

6. The method of claim 1 wherein the battery is charged and discharged at least 200 times and the solid-electrolyte interphase remains stable as demonstrated by a capacity retention by the battery of at least 70% at cycle 200.

7. The method of claim 1 wherein the battery is charged and discharged at least 200 times and the solid-electrolyte interphase remains stable as demonstrated by a capacity retention by the battery of at least 80% at cycle 200.

8. The method of claim 1 wherein the battery is charged and discharged at least 200 times and the solid-electrolyte interphase remains stable as demonstrated by a capacity retention by the battery of at least 90% at cycle 200.

9. The method of claim 1 wherein the organic additive comprises mono-(trimethylsilyl)phosphite.

10. The method of claim 1 wherein the organic additive comprises tris(trimethylsilyl)phosphite.

11. The method of claim 1 wherein the organic additive comprises tris(trimethylsilyl)phosphate.

12. The method of claim 1 wherein the organic additive comprises tris(trimethylsilyl)borate.

13. The method of claim 1 wherein the organic additive comprises tris(trimethylsiloxy)vinylsilane.

14. The method of claim 1 wherein the organic additive comprises tris(trimethylsilyl)silane.

15. The method of claim 1 wherein the organic additive comprises tris(trimethylsiloxy) ethylene.

16. A method comprising:
    generating an electrolyte solution that comprises a lithium salt, ethylene carbonate, and an organic additive, wherein the organic additive contains at least one methylsiloxy functional group $((CH_3)_3SiO—)$;
    constructing a lithium ion battery that comprises: (i) an anode comprising silicon; (ii) a cathode; and (iii) the electrolyte solution; and
    charging and discharging the lithium ion battery to form a solid-electrolyte interphase on the anode.

17. The method of claim 16, wherein the organic additive is selected from the group consisting of mono-(trimethylsilyl)phosphite, tris(trimethylsilyl)phosphite, tris(trimethylsilyl)phosphate, tris(trimethylsilyl)borate, tris(trimethylsiloxy)vinylsilane, and tris(trimethylsiloxy) ethylene.

* * * * *